United States Patent
Cote et al.

(10) Patent No.: US 6,645,374 B2
(45) Date of Patent: Nov. 11, 2003

(54) MEMBRANE MODULE FOR GAS TRANSFER AND MEMBRANE SUPPORTED BIOFILM PROCESS

(75) Inventors: Pierre Cote, Oakville (CA); Steven Pedersen, Burlington (CA); Henry Behmann, Puslinch (CA); Hidayat Husain, Brampton (CA); Deonarine Phagoo, Toronto (CA)

(73) Assignee: Zenon Environmental Inc., Oakville (CA)

( * ) Notice: Subject to any disclaimer, the term of this patent is extended or adjusted under 35 U.S.C. 154(b) by 0 days.

(21) Appl. No.: 10/370,527

(22) Filed: Feb. 24, 2003

(65) Prior Publication Data

US 2003/0150798 A1 Aug. 14, 2003

Related U.S. Application Data

(62) Division of application No. 09/799,524, filed on Mar. 7, 2001, now Pat. No. 6,558,549.
(60) Provisional application No. 60/189,498, filed on Mar. 15, 2000, and provisional application No. 60/188,023, filed on Mar. 9, 2000.

(30) Foreign Application Priority Data

| Mar. 8, 2000 | (CA) | 2300209 |
|---|---|---|
| Mar. 15, 2000 | (CA) | 2300719 |

(51) Int. Cl.[7] ................ C02F 3/30; C02F 3/06
(52) U.S. Cl. ............ 210/151; 210/195.3; 210/206; 210/903; 210/906
(58) Field of Search ................ 210/150, 151, 210/195.3, 198.1, 206, 259, 903, 906

(56) References Cited

U.S. PATENT DOCUMENTS

| 4,126,544 A | * | 11/1978 | Baensch et al. | 210/610 |
|---|---|---|---|---|
| 4,181,604 A | * | 1/1980 | Onishi et al. | 210/615 |
| 4,416,993 A | * | 11/1983 | McKeown | 435/243 |
| 4,746,435 A | * | 5/1988 | Onishi et al. | 210/615 |
| 4,883,594 A | * | 11/1989 | Sekoulov et al. | 210/603 |
| 5,034,164 A | * | 7/1991 | Semmens | 261/122.1 |
| 5,116,506 A | * | 5/1992 | Williamson et al. | 210/610 |
| 5,126,050 A | * | 6/1992 | Irvine et al. | 210/615 |
| 5,149,649 A | * | 9/1992 | Miyamori et al. | 435/400 |
| 6,013,511 A | * | 1/2000 | Diels et al. | 435/262.5 |
| 6,183,643 B1 | * | 2/2001 | Goodley | 210/605 |
| 6,531,062 B1 | * | 3/2003 | Whitehill | 210/602 |
| 6,558,549 B2 | * | 5/2003 | Cote et al. | 210/605 |

FOREIGN PATENT DOCUMENTS

| DE | 3544382 | * | 6/1987 |
|---|---|---|---|
| DE | 4440464 | * | 6/1996 |
| JP | 54-21057 | * | 2/1979 |

* cited by examiner

*Primary Examiner*—Fred G. Prince
(74) *Attorney, Agent, or Firm*—Bereskin & Parr

(57) ABSTRACT

An apparatus to transfer gas to or from a liquid has a flexible and oxygen permeable but liquid water impermeable membrane, a flexible and gas permeable spacer, an inlet conduit, an outlet conduit and a non-rigid restraint system. When used for treating wastewater, an aerobic biofilm is cultured adjacent the planar elements, an anoxic biofilm is cultivated adjacent the aerobic biofilm and the wastewater is maintained in an anaerobic state. A first reactor for treating wastewater has an anaerobic section, a plurality of gas transfer membrane modules, and an aerobic section. A biofilm is cultivated on the surface of the gas transfer membranes in fluid communication with the anaerobic section. Biological reduction of COD, BOD, nitrogen and phosphorous are achieved. In a second reactor, phosphorous is also removed chemically in a precipitation branch.

11 Claims, 10 Drawing Sheets

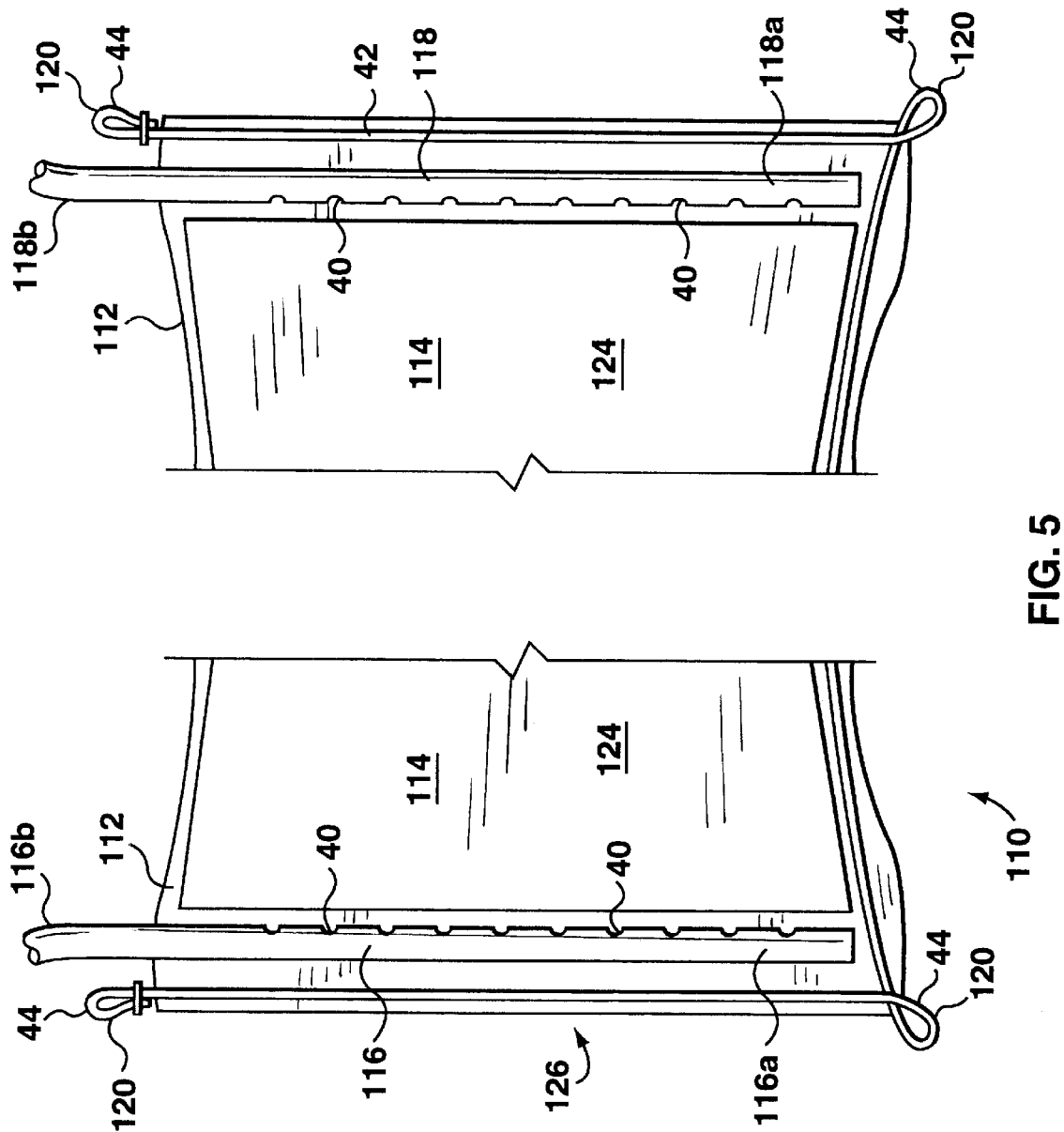

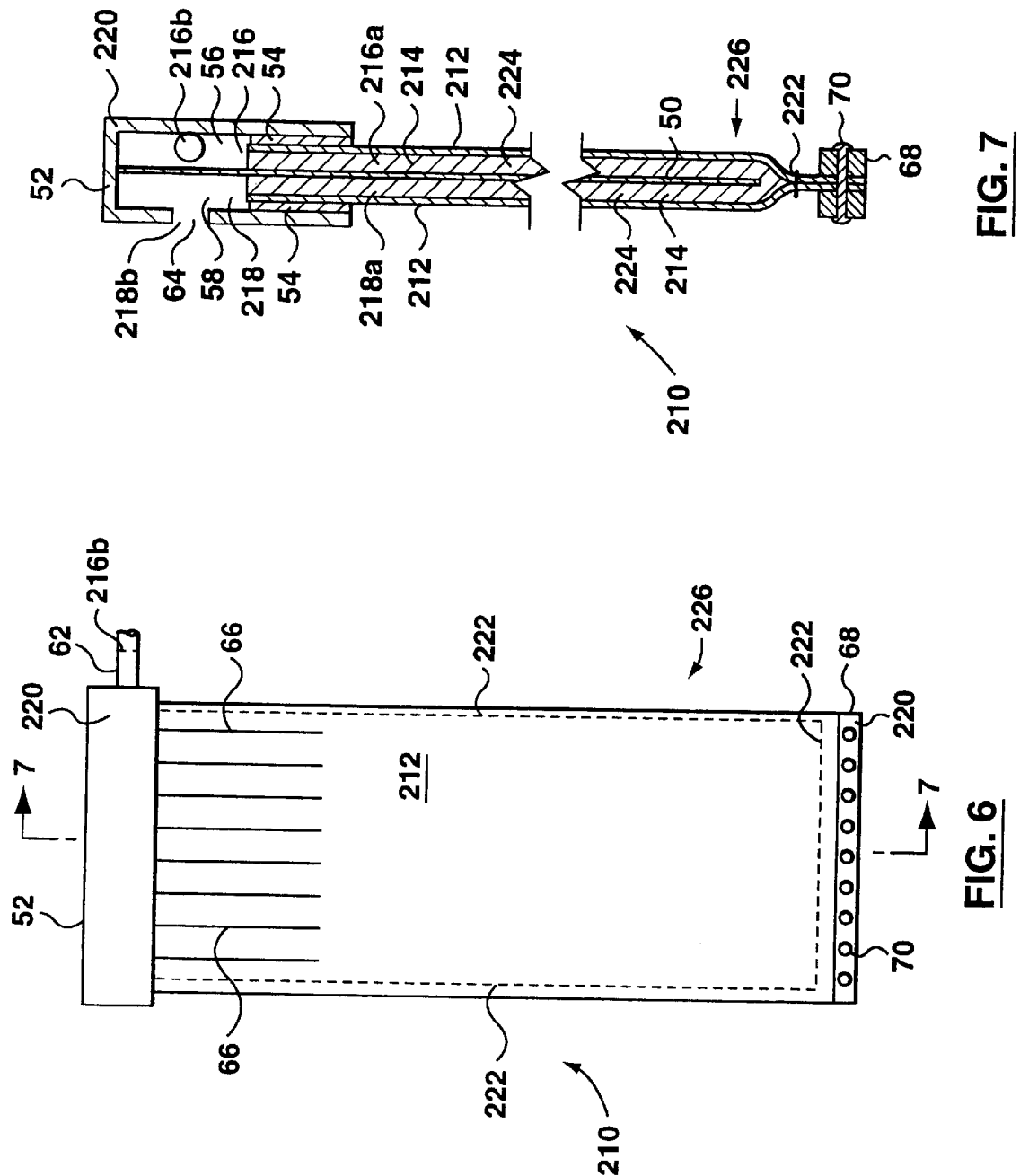

MEMBRANE MODULE FOR GAS TRANSFER AND MEMBRANE SUPPORTED BIOFILM PROCESS

This is application is a division of U.S. application Ser. No. 09/799,524, filed Mar. 7, 2001 now U.S. Pat. No. 6,558,549 which is a non-provisional of provisional application No. 60/188,023; filed Mar. 9, 2000, and No. 60/189,498 filed Mar. 15, 2000, and claims priority from Canadian Patent Application Nos. 2,300,209; filed Mar. 8, 2000, and 2,300,719; filed Mar. 15, 2000. All of U.S. application Ser. Nos. 09/799,524; 60/188,023; 60/189,498; and Canadian Application Nos. 2,300,209 and 2,300,719 are incorporated herein by this reference to them.

FIELD OF THE INVENTION

This invention relates to membrane modules used to transfer a gas to or from a liquid and to a process using a membrane supported biofilm for treating wastewater to remove one or more of nitrogen, phosphorous, BOD and COD.

BACKGROUND OF THE INVENTION

Transferring gases to or from a liquid is most commonly practiced by providing a bubble diffuser in the liquid. As bubbles rise through the liquid, gases move across the boundary of the bubble driven by the relative partial pressures of the gas in the bubble and in the liquid. Such a process has serious drawbacks including high energy costs, difficulty in independently controlling mixing of the liquid, foaming on the liquid surface and lack of control over the gas released by the bubbles as they break at the liquid surface. Gas permeable membrane modules provide an alternate means for transferring a gas to or from a liquid and have been used in various reactor designs. Some examples are described below.

U.S. Pat. No. 4,181,604 (issued to Onishi et al. on Jan. 1, 1980), describes a module having several loops of hollow fibre membranes connected at both ends to a pipe at the bottom of a tank containing wastewater. The pipe carries a gas containing oxygen to the lumens of the membranes. Oxygen flows through the membranes to the wastewater and to an aerobic biofilm growing on the outer surface of the membranes. In U.S. Pat. No. 4,746,435 (issued to Onishi et al. on May 24, 1988), the same apparatus is used but the amount of oxygen containing gas is controlled to produce a biofilm having aerobic zones and anaerobic zones.

U.S. Pat. No. 4,416,993 (issued to McKeown on Nov. 22, 1983), describes a membrane module in the form of a hollow plate. The plates are made of a rigid frame wrapped in a porous "netting" made of PTFE laminated to a woven nylon fabric. The plates are attached to an overlapping strip which has an inlet port and an outlet port.

In "Bubble-Free Aeration Using Membranes: Mass Transfer Analysis" (*Journal of Membrane Science*, 47 (1989) 91–106) and "Bubble-Free Aeration Using Membranes: Process Analysis" (*Journal Water Pollution Control Federation*, 1988, Volume 60, Number 11, 1986–1992), Côté et al. describe the use of silicone rubber tubes to transfer oxygen to water without creating bubbles in the water. The apparatus for these studies includes a module having vertically oriented tubes suspended between an inlet header and an outlet header. The module is immersed in a tank containing water recirculated by a pump to provide a horizontal current in the tank.

U.S. Pat. No. 5,116,506 (issued to Williamson et al. on May 26, 1992) describes a reactor having a gas permeable membrane dividing the reactor into a gas compartment and a liquid compartment. The gas compartment is provided with oxygen and methane which diffuse through the membrane to support a biofilm layer in the liquid compartment. The membrane is made of a teflon and nylon laminate commonly known as Gore-tex (TM). In one embodiment, the membrane divides the reactor into lower and upper portions. In another embodiment, the gas compartment rotates within the liquid compartment.

In "Studies of a Membrane Aerated Bioreactor for Wastewater Treatment" (MBR 2—Jun. 2, 1999, Cranfield University), Semmens et al. describe a membrane module having microporous polypropylene hollow fibres stitched together to form a fabric. The fabric is mounted between a gas inlet header and a gas outlet header such that the fibres are oriented horizontally. The module is immersed in water in an open reactor with water recirculated by a pump to provide a horizontal current in the reactor.

Despite the variety of designs available, gas transfer membranes have not achieved widespread commercial success. Common criticisms of modules or reactors include (a) that membrane materials lack sufficient strength to be durable in hostile environments (b) that membrane surface area is inadequate, particularly for a tank of a fixed and pre-selected size, (c) that excessive movement of liquid is required which is costly to implement in large systems, (d) that biofilm growth on the membranes is difficult to prevent or maintain at a controlled thickness and (e) that even small leaks or defects in the membranes cause a significant loss of system capacity.

Gas transfer is used for a number of processes, one of which is wastewater treatment. Discharging wastewater containing large amounts of carbon (BOD or COD), nitrogen and phosphorous into a natural body of water causes eutrophication, algae blooms, pollution and health problems. Various processes have been developed to treat wastewater to remove some or all of the carbon, nitrogen and phosphorous, some of which will be summarized below.

Activated Sludge with Chemical Phosphorous Removal

In a typical activated sludge process, wastewater flows in series through an anoxic reactor, an aerobic reactor and a clarifier. Effluent from the clarifier is released to the environment. Activated sludge from the bottom of the clarifier is partially recycled to the anoxic reactor and partially wasted. Significant removal of nitrogen requires a significant rate of recycle to alternately nitrify and denitrify the wastewater.

Phosphorous is removed by dosing soluble metal salts, such as ferric chloride or aluminum sulphate, at one or more points in the process into the aerobic reactor to precipitate phosphate metal salts. The waste water, however, contains many different ions which create undesirable side reactions. As a result, and particularly where very low effluent total phosphorus levels are required, precipitating phosphorous may require the addition of 2–6 times the stoichiometric amount of the metal salt. Accordingly, these processes result in high chemical costs, high sludge production, and a high level of metallic impurities in the sludge.

Activated Sludge with Biological Phosphorous Removal

Activated sludge techniques can also be modified to use microorganisms to store the phosphates. For example, U.S. Pat. No. 4,867,883 discusses a process which attempts to encourage the selection and growth of Bio-P organisms which uptake phosphorus in excess of the amount normally needed for cell growth. Generally, the process consists of an anaerobic zone, an anoxic zone, an aerobic zone, and a clarifier. In the anaerobic zone, soluble BOD is assimilated and stored by the Bio-P organisms and phosphorus is released. Subsequently, in the anoxic and aerobic zones, the stored BOD is depleted and soluble phosphorous is taken-up in excess and stored as polyphosphates by the Bio-P organisms. In the clarifier, sludge containing phosphates settles out of the effluent. There is a denitrified recycle from the anoxic zone to the anaerobic zone, a nitrified recycle from the aerobic zone to the anoxic zone, and an activated sludge recycle from the clarifier to the anoxic zone. The sludge recycle is done in multiple phases to ensure that nitrates are not recycled to the anaerobic zone, which would limit phosphorous release. The biological mechanism by which bacteria release phosphorous in the anaerobic section involves the uptake of easily assimilated organic compounds such as volatile fatty acids (VFA). Depending on the level of VFA in the raw wastewater, an extra anaerobic section may be added at the head of the process.

One problem with this process is that the settling characteristics of the sludge in the clarifier impose significant design limitations. For example, the process cannot operate at very high process solids levels or high sludge retention times, particularly when high removal rates of both nitrogen and phosphorous are required. As a result, the system is generally considered to be inefficient and there is a high generation rate of waste sludge. In some cases, sand filters are added to the tail of the process to help remove solids carryover from an overloaded clarifier and reduce the amount of phosphorous in the effluent.

Another problem with this process is that there is a buildup of phosphates in the system. The waste activated sludge contains Bio-P organisms rich in phosphorous. When the organisms in the waste activated sludge are digested, they release phosphorus which is typically returned back to the process in the form of digester supernatant. Consequently, this reduces the efficiency of phosphorus removal in the process and results in higher levels of phosphorus in the effluent. A partial solution to this problem is to employ a side stream process called 'Phos-Pho Strip' as described in U.S. Pat. No. 3,654,147. In this process, activated sludge passes from the clarifier to a phosphorus stripper. In the stripper, phosphorus is released into the filtrate stream by either: creating anaerobic conditions; adjusting the pH; or extended aeration. The resulting phosphate-rich filtrate stream passes to a chemical precipitator. The phosphate-free effluent stream is added to the main effluent stream, the waste stream from the precipitator containing the phosphates is discarded, and the phosphate-depleted activated sludge is returned to the main process.

Membrane Bioreactor with Chemical Precipitation

A membrane bioreactor can be combined with chemical precipitation techniques. In a simple example, precipitating chemicals are added to an aerobic tank containing or connected to a membrane filter. As above, however, dosages of precipitating chemicals substantially in excess of the stoichiometric amount of phosphates are required to achieve low levels of phosphates in the effluent. This results in excessive sludge generation and the presence of metallic precipitates which increase the rate of membrane fouling or force the operator to operate the system at an inefficient low sludge retention time.

Membrane Supported Biofilm

U.S. Pat. No. 4,181,604 describes a module having several loops of hollow fibre membranes connected at both ends to a pipe at the bottom of a tank containing wastewater. The pipe carries a gas containing oxygen to the lumens of the membranes through which the gas is supplied to the wastewater and to an aerobic biofilm growing on the outer surface of the membranes. In U.S. Pat. No. 4,746,435, the same apparatus is used but the amount of oxygen containing gas supplied is controlled to produce a biofilm having aerobic zones and anaerobic zones and 1 to 7 ppm of oxygen in the waste water. This process provides simultaneous nitrification and denitrification without sludge recirculation but no phosphorous removal.

U.S. Pat. No. 5,116,506 describes a reactor having an oxygen containing gas permeable membrane separating a reactor into a liquid compartment and a gas compartment. The liquid compartment contains wastewater. The gas compartment is provided with oxygen which diffuses through the membrane to support a biofilm layer. The biofilm layer has two parts, an aerobic layer adjacent the membrane and an anaerobic layer adjacent the wastewater. This process also provides simultaneous nitrification and denitrification but again no phosphorous removal.

SUMMARY OF THE INVENTION

It is an object of the present invention to provide a membrane module for transferring a gas to or from a liquid. Such modules can be used, for example, in supporting and providing oxygen to a biofilm, in water degassing, in humidification, in pervaporation and to clean air. An object of the present invention is to provide a process for treating wastewater to produce an effluent with reduced concentrations of one or more of nitrogen, phosphorous and carbon (BOD or COD). These objects are met by the combination of features, steps or both found in the claims. The following summary may not describe all necessary features of the invention which may reside in a sub-combination of the following features or in a combination with features described in other parts of this document.

In one aspect, the invention provides an apparatus for transferring a gas to or from a liquid having a flexible and gas diffusive but liquid water impermeable membrane and a flexible spacer open to gas flow. The spacer and the membrane together form a planar element with the membrane enclosing an inner space containing the spacer. One or more conduits are provided for transferring gas between the inner space and the atmosphere or another location outside of the water and the inner space. One or more tensile members or weights non-rigidly restrain the planar element in a selected position in a selected reactor. Gases that may be transferred include oxygen, nitrogen, volatile organic compounds, hydrogen, and water vapour.

In another aspect, the invention provides a module for transferring a gas to or from a liquid having a plurality of the apparatus described above and a gas manifold. The second ends of the gas inlet conduits are connected in fluid communication with the manifold to admit gas to the planar elements. The manifold is mounted above the water surface of a reactor while the planar elements are located below the water surface of the reactor. The reactor has a tank having a generally straight flow path covering a substantial portion of the tank between an inlet and an outlet. The planar elements are restrained in positions in the reactor in which they are generally parallel to the flow path. In a wastewater treatment applications, the reactor has a source of agitation for agitating the planar elements to release accumulated biofilm from time to time.

In another aspect, the invention is directed at a process for transferring a gas to or from a liquid comprising the steps of (a) immersing one or more of the planar elements described above in the liquid and (b) supplying a gas to the planar elements at a pressure which does not create bubbles in the liquid, the gas leaving the planar elements by diffusion or by forced circulation using a pump. For some embodiments, the pressure of the gas is preferably also less than the pressure of the wastewater against the planar elements.

In another aspect, the invention provides a hybrid wastewater treatment reactor combining a membrane supported biofilm and suspended growth biomass. The reactor has a first section containing a plurality of gas transfer membrane modules connected to an oxygen source and a second section having an oxygen source operable to create aerobic conditions in the second section. In the first section, the supply of oxygen to the membrane modules is controlled to cultivate a biofilm on the surface of the membranes having aerobic and anoxic zones and to facilitate cultivation of an anaerobic mixed liquor in the first section generally. In the second section, the diffusers and oxygen source facilitate cultivation of an aerobic mixed liquor. Wastewater enters the reactor through an inlet to the first section and flows through the reactor so as to be treated in the anaerobic section, in the aerobic section and by contact with the biofilm before leaving the reactor through a solid/liquid separator downstream of the second section. A portion of the settled sludge at the bottom of the clarifier is recycled to the first section.

Biological digestion of BOD, COD, nitrogen and phosphorous are achieved as summarized below:

Rough removal of BOD or COD and nitrogen occur in the biofilm.

Polishing denitrification and sludge reduction occur in the anaerobic mixed liquor.

Volatile fatty acids (VFA) are assimilated and phosphorous is released in the anaerobic mixed liquor.

polishing COD and BOD removal, polishing nitrification and biological phosphorous uptake occur in the aerobic mixed liquor.

phosphorous is extracted as excess biomass by wasting a portion of the sludge settled in the clarifier.

In another aspect, the invention provides a modified reactor in which phosphorous is also extracted as a chemical precipitate. The anaerobic mixed liquor is most often quiescent allowing partial sedimentation of the anaerobic mixed liquor which produces a phosphorous rich solution near its surface. Alternatively, a portion of the anaerobic mixed liquor is treated in a solid-liquid separation device to produce a phosphorous rich solution. The phosphorous rich solution is treated in a precipitation branch having a source of phosphorous precipitating agents such as metal salts and a precipitate separation device such as a clarifier or hydrocyclone.

BRIEF DESCRIPTION OF THE DRAWINGS

Preferred embodiments of the present invention will now be described with reference to the following figures.

FIGS. 3, 4 and 5 show a second apparatus in elevation, sectional and front removed views respectively.

FIGS. 6 and 7 show a third apparatus in elevation and sectional views respectively.

DETAILED DESCRIPTION OF EMBODIMENTS

A First Embodiment

Figure 1:
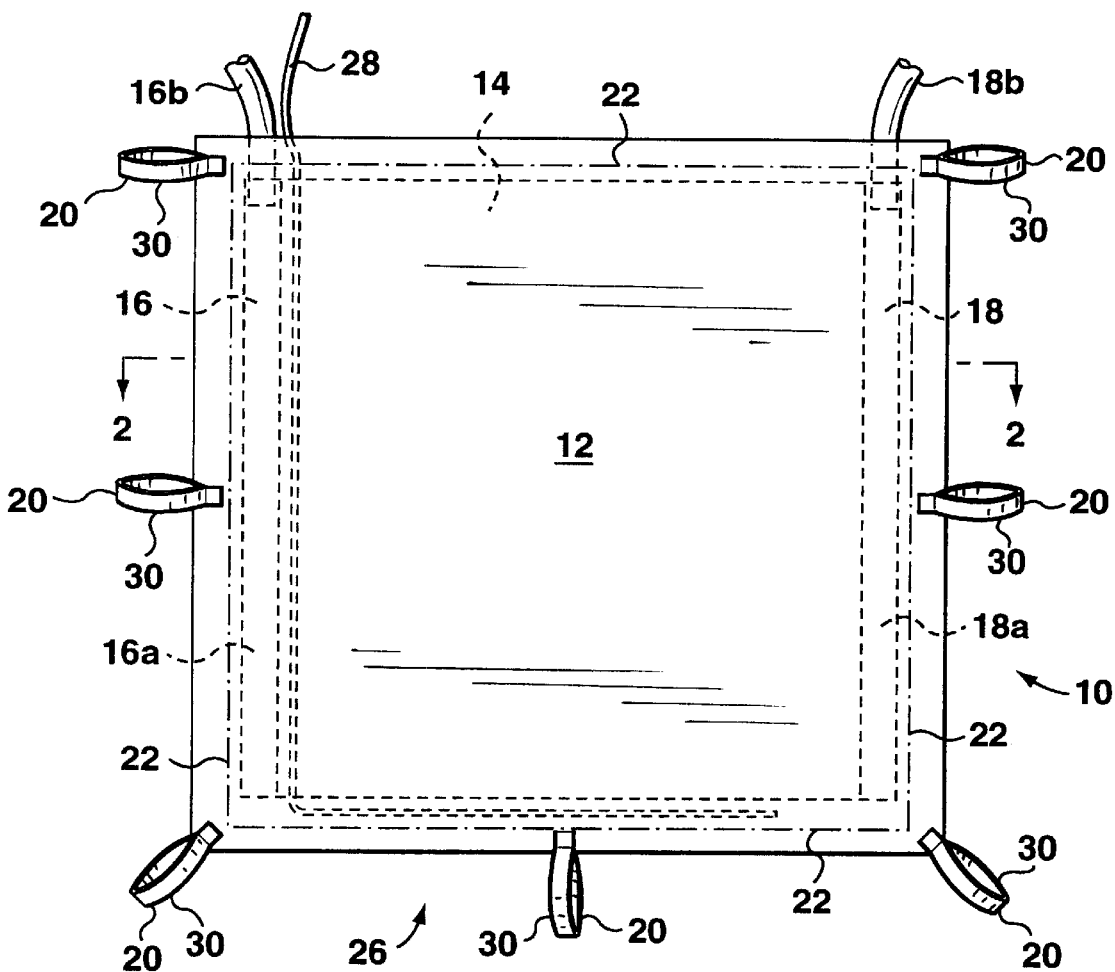
FIGS. 1 and 2 show a first apparatus in elevation and sectional views respectively.
Figure 2:
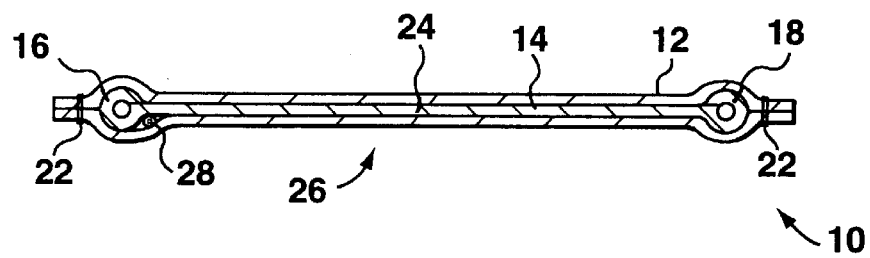

FIGS. 1 and 2 show a first apparatus 10 having a membrane 12, a spacer 14, an inlet conduit 16, an outlet conduit 18, and a non-rigid restraint system 20.

The membrane 12 is a sheet material that can be sewed or glued into a variety of constructions. In the embodiment illustrated, a piece of the sheet material of an appropriate size, which may be made of several smaller pieces, is folded in half around the spacer 14 and fastened to itself with a line of stitching 22 or glue. All lines of stitching 22 of the first apparatus 10 (and all subsequent apparatuses described below) expected to be in contact with water are sealed by coating them with liquid silicone rubber or another waterproof adhesive. The membrane 12 thus encloses an inner space 24 containing the spacer 14. The spacer 14 and the membrane 12 together form a planar element 26.

The membrane 12 is flexible and gas diffusive but liquid water impermeable. By liquid water impermeable, we mean that a water molecule may diffuse through the membrane 12 under a suitable driving force (for example, if the gas within the inner space 24 is not at 100% humidity) but that water will not flow in the liquid state through the membrane 12. A preferred membrane 12 is made of a woven or non-woven textile fabric, such as nylon, coated or impregnated with a gas permeable but water impermeable layer. Silicone rubber is preferred for the layer because of its high permeability to oxygen and availability in liquid and spray forms but the layer must be inspected carefully to ensure that it is free of voids. Alternative membranes may be constructed of microporous hydrophobic materials which do not wet under typical hydrostatic pressures such as polypropylene or PTFE. The spacer 14 is flexible and open to gas flow generally parallel to the membrane 12. Suitable materials are sold for use as spacers in reverse osmosis modules. For example, VEXAR (TM), a polypropylene expandable diamond mesh made by Valtex may be used.

The inlet conduit 16 and the outlet conduit 18 have first ends 16a and 18a in fluid communication with the inner space 24. The inlet conduit 16 and the outlet conduit 18 each also have second ends 16b and 18b extending outwardly from the first planar element 26. Waterproof glue is applied to the point where the inlet conduit 16 and the outlet conduit 18 exit from the planar element 26 to prevent water from leaking into the inner space 24.

The inlet conduit 16 and the outlet conduit 18 are made of a composite construction. A part near the second ends 16b and 18b of the conduits 16 and 18 is a flexible solid tube. The second end 16b of the inlet conduit 16 has a releasable water tight connector to a header (not illustrated). The second end 18b of the outlet conduit 18 may be exhausted to the atmosphere in some applications but may also be collected in a header (not illustrated). Each flexible tube ends shortly below the start of the spacer 14. From this point, each of the conduits 16, 18 is made of a section of the spacer 14 or membrane 12. As illustrated, the conduits 16, 18 are a section of the spacer 14 rolled to create a porous conduit which admits the flexible tube and extends along a side of the first planar element 26. Alternatively, the spacer 14 may be folded over itself to form the conduits 16, 18 or a flexible spring can be inserted into a tubular section of the membrane 12 adjacent the spacer 14 to form conduits 16, 18.

Preferably, the inlet conduit 16 and outlet conduit 18 are located at opposed sides of the planar element 26 so that oxygen containing gas entering the inlet conduit 16 will travel across the planar element 26 before leaving through the outlet conduit 18. Further preferably, each of the conduits 16, 18 extends substantially along their respective opposed sides of the planar element 26 and are porous along a substantial portion of their length inside of the planar element 26. In this way, the gas is encouraged to flow across the planar element 26 in a well distributed flow pattern. Optionally, gas can be encouraged to flow downwardly or, preferably, upwardly by placing the conduits 16, 18 across the horizontal sides of the planar element 26 rather than the vertical sides of the planar element 26.

A drain tube 28 may also be provided having a first end in fluid communication with the bottom of the planar element 26 and a second end extending out of the planar element 26. The drain tube 28 is sealed with glue where it exits the planar element 26. The second end of the drain tube 28 is provided with a fitting so that it can be connected to a pump for withdrawing water from the inner space 24 of the planar element 26. Under ideal conditions, such a drain tube 28 is not required. From time to time, however, minute defects may develop in the planar element 26 that admit small amounts of water. Further, under some conditions water vapour may condense and accumulate in the inner space 24. In either case, the use of a drain tube 28 avoids the need to periodically remove the first apparatus 10 to remove water from the inner space 24. Alternatively, the drain tube 28 can be inserted into the bottom of the planar element 26 through the outlet conduit 18.

The restraint system 20 consists of a series of tensile members in the form of loops 30, preferably made of the same material as the membrane 12 or another suitable fabric. The loops 30 are sewed or glued to the edges of the planar element 26 to provide a series of points of attachment. Grommets, hooks or other fasteners might also be used provided that they distribute any expected load enough to avoid tearing the edges of the planar element 26. The restraint system 20 permits the planar element 26 to be fixedly but non-rigidly restrained in a selected position in a selected reactor by passing a wire or rope fixed to the reactor through the loops 30. In some cases, the wire or rope may assume a curved shape. In these cases, the lengths of the loops 30 are preferably varied to accommodate the curved shape and so to transfer the tensile force to the planar element 26 evenly across the loops 30. Alternately, a larger number of tensioned wires or rope can be fitted at one end to a reactor and at the other end to the planar element 26 with clamping connectors such as those used to secure tarps. In this case, the edge of the planar element serves the purpose of the tensile member and is reinforced as required.

Figure 10:
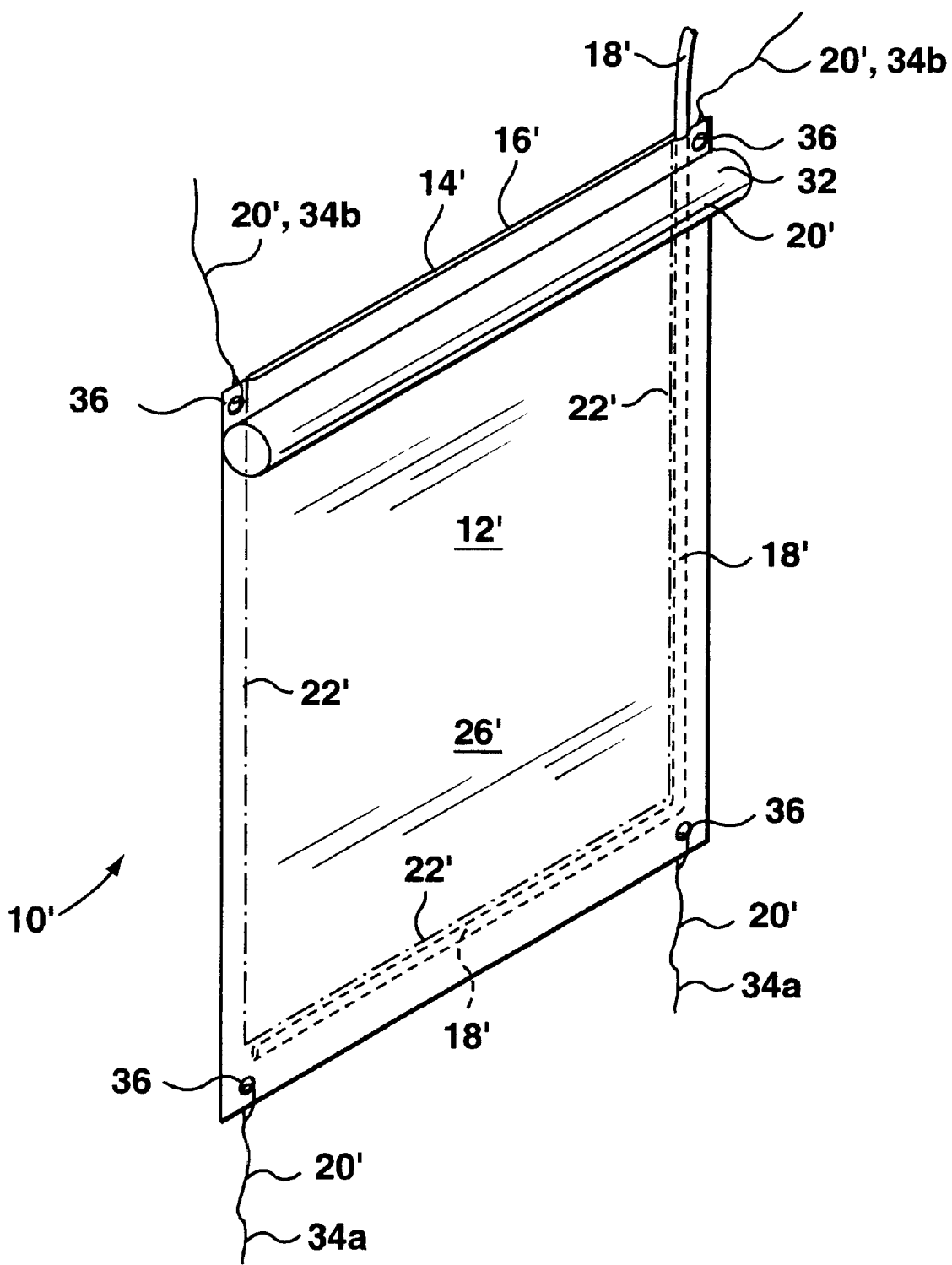
FIGS. 10 and 11 are drawings of alternative configurations of the first apparatus.

An alternative version of the first apparatus 10' is shown in FIG. 10. In this alternate version, a planar element 26' is formed of a spacer 14' and a membrane 12' assembled using a line of stitching 22'. A restraint system 20' has floats 32 sized to keep the top of the first apparatus 10' above a water surface. The bottom of the first apparatus 10' is kept submerged with tensile elements made of wires 34a attached to grommets 36. When the water is lowered or drained for maintenance etc., second wires 34b attached to grommets 36 perform the function of the floats 32 in restraining the top of the first apparatus 10'. The inlet conduit 16' is a short section at the top of the first apparatus 10' in which the spacer 14' is exposed to the atmosphere. The outlet conduit 18' extends down one side and across the bottom of the first apparatus 10' but is only porous along the bottom of the first apparatus 10'. The outlet conduit 18' is attached to a suction pump to draw air in through the apparatus 10' from top to bottom. Small amounts of water entering the first apparatus 10' are withdrawn periodically by increasing suction to the outlet conduit 18'.

Figure 11:
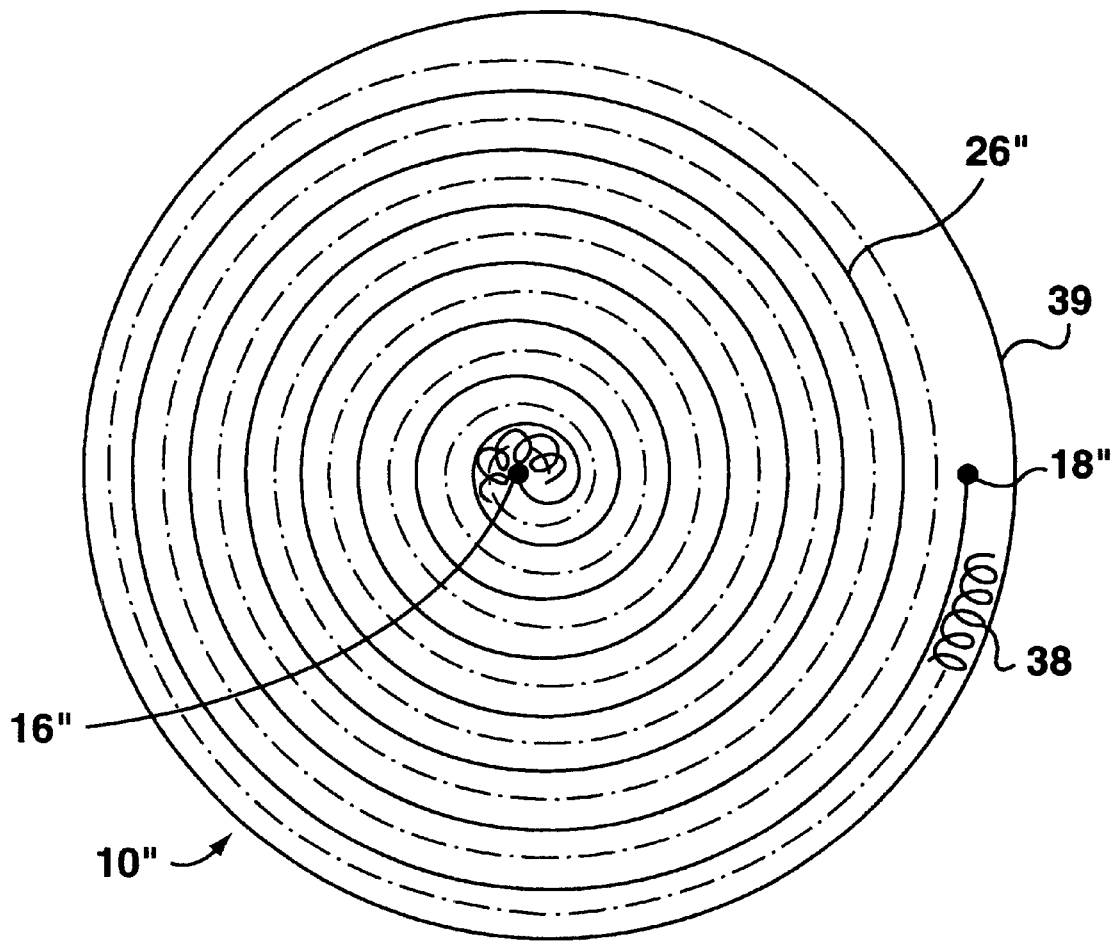

A plan view of another alternative version of the first apparatus 10" is shown in FIG. 11. In this version, one or more planar elements 26" of the first apparatus 10" are wound in a spiral. The layers of the spiral are separated by one or more loose springs 38 or other open spacers, preferably spaced apart at regular intervals along the axis of the spiral. Gas enters and exists through conduits 16" and 18" but the order the relative locations of the conduits 16" and 18" illustrated may be reversed. The first apparatus 10" is preferably mounted in a cylindrical vessel 39 which may be a tank or a large pipe. Flow of water through the vessel 39 may be made to follow the spiral of the first apparatus 10" by placing one of an inlet and outlet in the centre of the vessel and the other of the inlet and outlet at the perimeter of the vessel 39. Alternatively, flow of water through the vessel 39 may be made to be parallel to the axis of the spiral, for example where the vessel 39 is a pipe, by providing an inlet at one end of the pipe, an outlet at another end of the pipe and placing the first apparatus 10" in between the inlet and outlet. Depending on the how tightly the first apparatus 10" is packed in the pipe, tensile members may not be required to restrain the first apparatus 10" in position, but tensile members or another restraint system are typically required where the vessel 39 is a large tank.

A Second Embodiment

Figure 3:
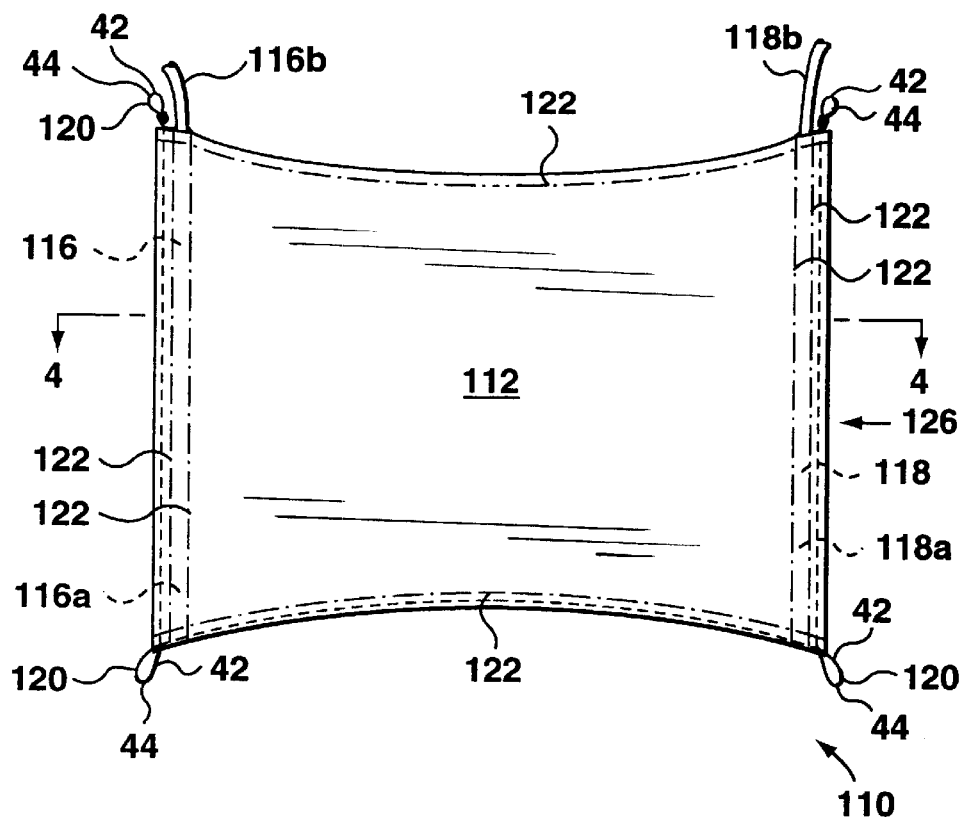
Figure 4:
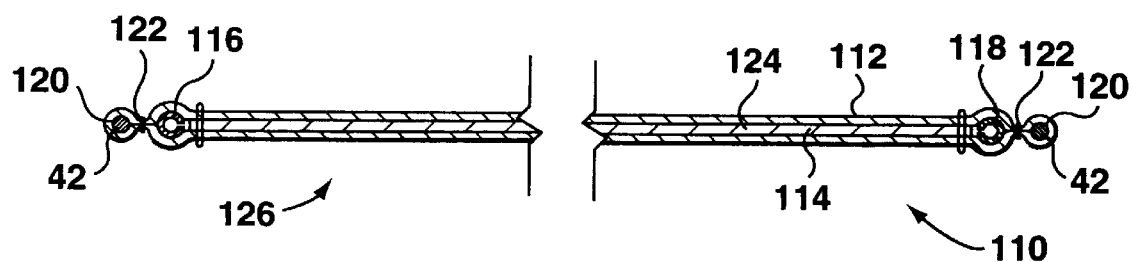

FIGS. 3, 4 and 5 show a second apparatus 110 for supporting and oxygenating an immersed biofilm. The second apparatus 110 has a membrane 112, a spacer 114, an inlet conduit 116, an outlet conduit 118, and a non-rigid restraint system 120.

The membrane 112 and spacer 114 are of the same material described for the first embodiment. The membrane 112 is similarly folded around the spacer 114 and fastened to itself with a line of stitching 122 or glue. Additional lines of stitching 122 are used to fix the inlet conduit 116, outlet conduit 118 and second restraint system 120 in the positions shown. The membrane 112 thus encloses an inner space 124 containing the spacer 114 and the spacer 114 and the membrane 112 together form a planar element 126.

The inlet conduit 116 and the outlet conduit 118 have first ends 116a and 118a in fluid communication with the inner space 124. The inlet conduit 116 and the outlet conduit 118 each also have second ends 116b and 118b extending outwardly from the planar element 126. Waterproof glue is applied to the point where the conduits 116, 118 exit from the second planar element 126 to prevent water from leaking into the inner space 124.

The inlet conduit 116 and the outlet conduit 118 are made of flexible solid tubes. The second end 116b of the inlet conduit 116 has a releasable water tight connector to a header (not illustrated). The second end 118b of the outlet conduit 118 may be exhausted to the atmosphere in some applications but may also be collected in a header (not illustrated). Starting shortly below the start of the spacer 114 each conduit has a plurality of perforations 40 to create a porous conduit. As for the first embodiment, the inlet conduit 116 and the outlet conduit 118 are preferably located at opposed sides of the planar element 126, extend substantially along their respective opposed sides and are porous along a substantial portion of their length inside of the second planar element 126. Optionally, gas can be encouraged to flow downwardly or, preferably, upwardly by placing the conduits 116, 118 across the horizontal sides of the second planar element 126 rather than the vertical sides of the first planar element 126. A drain tube (not illustrated) may also be provided.

The restraint system 120 consists of a tensile member in the form of a wire or rope 42 sewn or glued around a substantial part of the periphery of the planar element 126. The wire or rope 42 sticks out of the planar element 126 at a plurality of locations to provide points of attachment 44. Preferably, four points of attachment 44 are provided, one in each corner of the planar element 126. The restraint system 120 permits the planar element 126 to be fixedly but non-rigidly restrained in a selected position in a selected reactor by connecting the points of attachment 44 to a reactor with ropes or wire. This attachment may encourage the wire or rope 42 to assume a curved shape. In these cases, the relevant edges of the planar element 126 are made in a similar curved shape.

A Third Embodiment

FIGS. 6 and 7 show a third apparatus 210. The third apparatus 210 has a membrane 212, a spacer 214, an inlet conduit 216, an outlet conduit 218, and a non-rigid restraint system 220.

The membrane 212 is a sheet material as described for the previous embodiments. The structure of the third apparatus differs, however, in that the membrane 212 is folded around two layers of spacer 214 separated by a flexible but impermeable separator 50, preferably a plastic sheet. The edges of the membrane are fastened together by waterproof glue or a line of stitching 222 made waterproof with silicone rubber spray or glue. The membrane 212 thus encloses an inner space 224 containing the spacer 214 and the spacer 214 and the membrane 212 together form a planar element 226.

The inlet conduit 216 and the outlet conduit 218 have first ends 216a, 218a in fluid communication with the inner space 224. The inlet conduit 216 and the outlet conduit 218 also have second ends 216b, 218b extending outwardly from the planar element 226. In the third apparatus 210, the conduits 216, 218 include a part of the planar element 226 and a header 52. The planar element 226 is potted in the header 52 with gas impermeable glue 54 to make an airtight seal with the membrane 212 but leaving the spacer 214 in fluid communication with an inlet chamber 56 and an outlet chamber 58 of the header 52. The inlet chamber 56 and outlet chamber 58 are separated by the impermeable layer 50. The header 52 provides an upper mount for fixedly attaching the top of the planar element 226 in a selected position in a selected reactor.

Gas enters the third apparatus 210 through a tube 62 having one end in fluid communication with a gas source and a second end in fluid communication with the inlet chamber 56 of the header 52. From the inlet chamber 56, the gas enters the planar element 226 through the exposed edge of the spacer 214. The gas travels first downwards and then upwards through the spacer 214. The gas exits the planar element 226 through the other exposed edge of the spacer 214 into the outlet chamber 58 of the header 52 from which it leaves through several discharge ports 64 or alternately through a pipe to an outlet header (not illustrated). A drain tube (not illustrated) may also be provided having a first end in fluid communication with the bottom of the planar element 226 and a second end extending out of the planar element 226.

As the header 52 is intended to be mounted above water, a portion of the membrane 212 is either out of the water or in a depth of water that is not sufficient to keep the membrane 212 pressed against the spacer 214. In this portion, preferably less than one half of the area of the planar element 226, glues lines 66 substantially parallel to the primary direction of gas flow attach the membrane 212 to the spacer at selected intervals to prevent ballooning of the membrane 212. Similar glue lines may be used in appropriate orientations if required in the first apparatus 10 and second apparatus 110. In those cases, however, it is preferred if the first apparatus 10 and second apparatus 110 are submerged deep enough in relation to the pressure of gas to be used to allow the water pressure to keep the membrane 212 against the spacer 214.

The portion of the membrane 212 that is out of the water may permit some gas to diffuse to the atmosphere. Where the gas flowing within the membrane 212 is air, particularly air at a pressure below 10 kPa, the length of membrane 212 that is out of the water can be controlled to the point where diffusion to the atmosphere is acceptable. Where a pure gas such as oxygen. flows within the membrane 212, however, diffusion to the atmosphere may be significant and the atmosphere exposed portion of the membrane 212 is preferably sealed with a gas impermeable coating.

The restraint system 220 consists of the header 52, which may be fixedly mounted in a reactor, and a weight 68 attached to the bottom of the planar element 226. For this purpose, the membrane 212 extends below the bottom of the spacer 214 and the weight 68 is attached in two halves to the membrane 212 by rivets, 70 or other fasteners. The weight is of a sufficient size to keep the planar element 226 hanging vertically downwards from the header 52. Alternately, loops can be provided at the bottom of the third planar element 226 to allow attachment to the bottom of the reactor with ropes or wires.

Membrane Supported Biofilm Reactors for Wastewater Treatment

Figure 8:
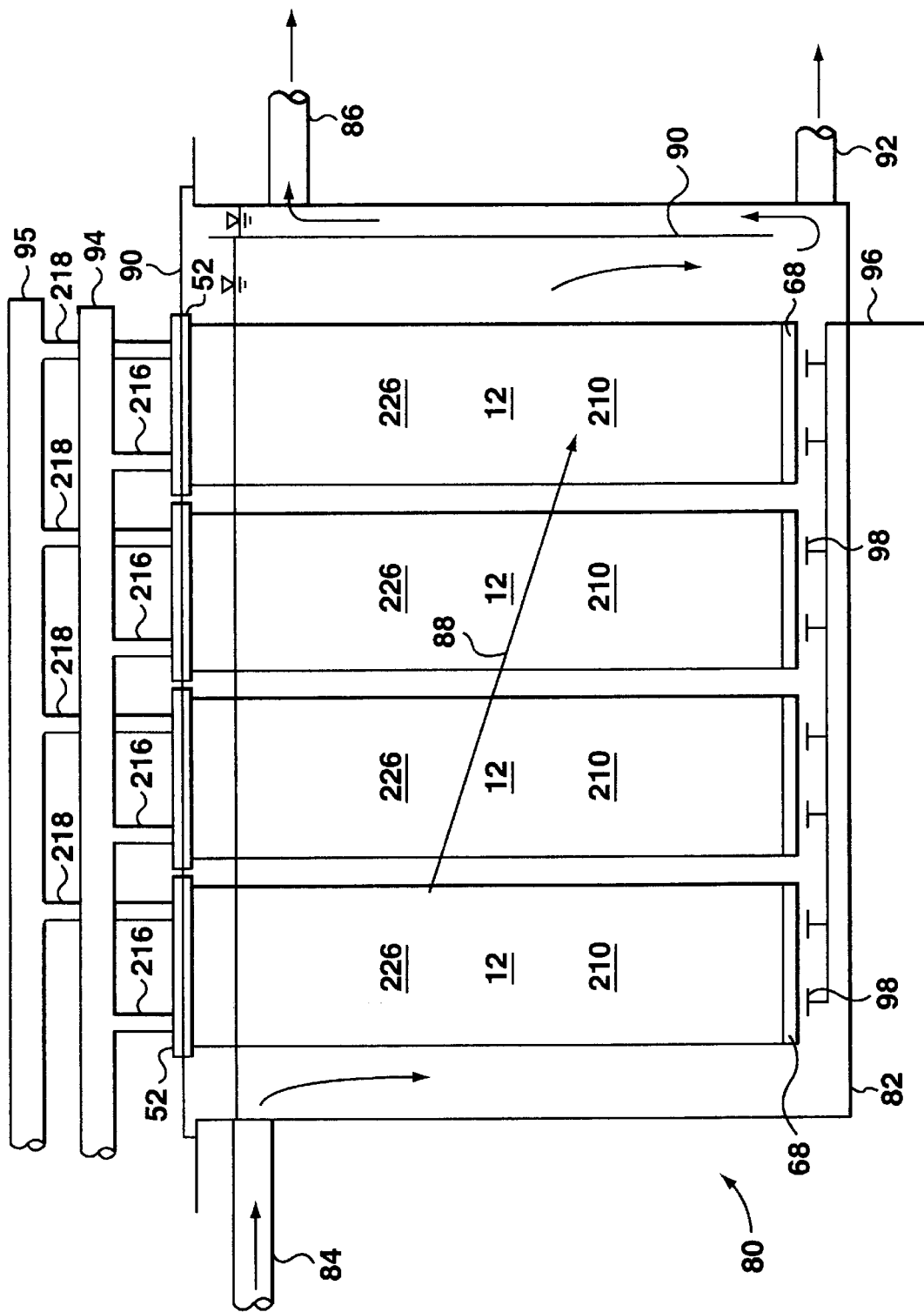
FIGS. 8 and 9 are schematic elevational representations of two reactors for use with the first, second or third apparatus.

FIG. 8 shows a reactor 80 having a tank 82, a feed inlet 84 to the tank 82, an effluent outlet 86 from the tank 82, a flow path 88 between the feed inlet 84 and effluent outlet 86 and a plurality of the third apparatus 210. The third apparatus 210 is shown as an example only and the second apparatus 110 or first apparatus 10 may also be used with suitable modifications to the reactor 80.

The planar elements 226 are sized to fit the tank 82 and fill a substantial amount of its volume. The planar elements 226 have no pre-manufactured or rigid frame and thus are preferably custom made to provide efficient use of the available space in the tank 82. For example, planar elements 226 may range from 0.5 m to 2 m wide and 2 to 10 m deep. The planar elements 226 are preferably arranged in the tank 82 in a number of rows, one such row being shown in FIG. 8. The planar elements 226 may range from 0.5 to 2 mm in thickness and adjacent rows are placed in the tank 82 side by side at a distance of 5 to 15 mm to allow for biofilm growth and wastewater flow between adjacent planar elements 226.

The tank 82 is longer than it is deep and it is preferred to encourage a generally horizontal flow path 88 with minimal mixing. This is done by leaving some space near the ends (ie. near the inlet 84 and outlet 86) of the tank 82 for vertical movement of water and leaving minimal free space at the top, bottom and sides of the tank 82. A baffle 90 may also be placed upstream of the effluent outlet 86 to force the flow path 88 to go under it. A sludge outlet 92 is provided to remove excess sludge.

The flow path 88 is generally straight over a substantial portion of the tank 82 between the feed inlet 84 and effluent outlet 86. Each third apparatus 210 is held in the tank 82 by its headers 52 attached to a frame 90 and by its weight 68. The headers 52, frame 90 and weights 68 restrain each third apparatus 210 in positions in the reactor 80 whereby the planar element 226 of each third apparatus 210 are generally parallel to the flow path 88. Preferably, a plurality of planar elements 226 are spaced in series along the flow path 88 so that the reactor 80 will more nearly have plug flow characteristics. Wastewater to be treated may be partially recycled from the effluent outlet 86 to the feed inlet 84. Such a recycle can increase the rate of gas transfer by increasing the velocity of wastewater along the flow path 88, but it is preferred if the recycle ratio is small so as to not provide more nearly mixed flow characteristics in the reactor 80.

Oxygen containing gas is provided to each third apparatus 210 through its inlet conduit 216 connected to an inlet manifold 94 located above the water to be treated. With the inlet manifold 94 located above the water, a leak in any third apparatus 210 will not admit water into the manifold nor any other third apparatus 210. Gas leaves each third apparatus 210 through its outlet conduit 218 which is connected to an exhaust manifold 95. Although it is not strictly necessary to collect the gases leaving each third apparatus 210, it does provide some advantages. For example, the gas in the exhaust manifold 95 may have become rich in volatile organic compounds which may create odour or health problems within a building containing the reactor 80. These gases are preferably treated further or at least vented outside of the building.

Preferably, the gas is provided at a pressure such that no bubbles are formed in the water to be treated and, more preferably, at a pressure of less than 10 kPa. This pressure is exceeded by the pressure of the water to be treated from one metre of depth and beyond. Preferably at least half of the area of the third planar elements 226 is below that depth. The water pressure thus prevents at least one half of the surface of the membranes 12 from ballooning.

Oxygen diffuses through the membranes 12. The amount of oxygen so diffused is preferably such that an aerobic biofilm is cultured adjacent the planar elements 226, an anoxic biofilm is cultivated adjacent the aerobic biofilm and the wastewater to be treated is maintained in an anaerobic state. Such a biofilm provides for simultaneous nitrification and denitrification. A source of agitation 96 is operated from time to time to agitate the planar elements 226 to release accumulated biofilm. A suitable source of agitation is a series of coarse bubble aerators 98 which do not provide sufficient oxygen to the water to be treated to make it non-anaerobic.

Figure 9:
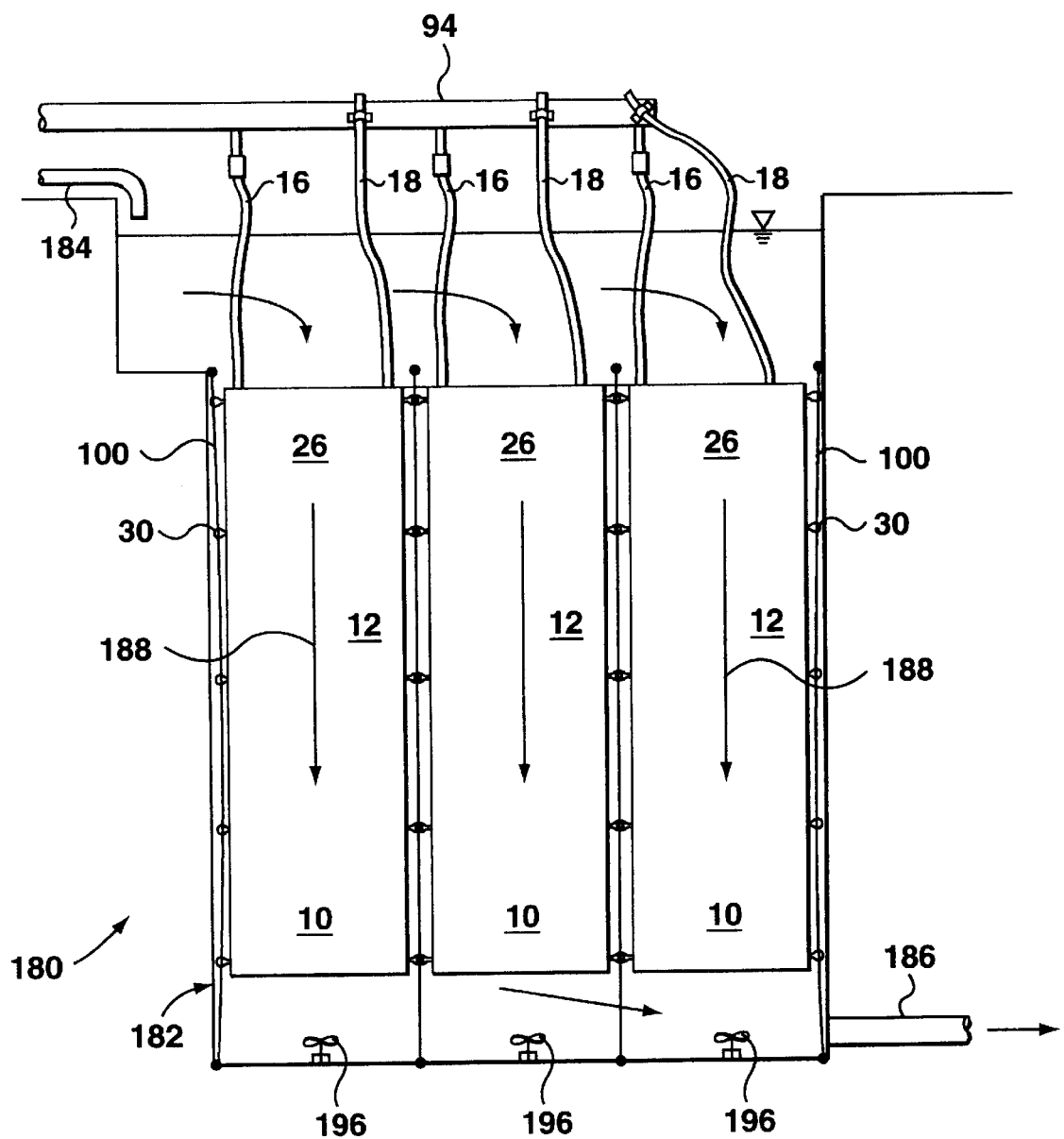

FIG. 9 shows a second reactor 180 having a tank 182, a feed inlet 184, an effluent outlet 186, a flow path 188 and a plurality of the first apparatus 10. The first apparatus 10 is shown as an example only and the second apparatus 110 or third apparatus 210 may also be used with suitable modifications to the second reactor 180.

Each first apparatus 10 is held by its loops 30 wrapped around wires 100 or ropes attached to the tank 182. The loops 30 and wires 100 restrain each first apparatus 10 in a position in the second reactor 180 whereby the planar element 26 of each first apparatus 10 is generally parallel to the flow path 188.

The first planar elements 26 are sized to fit the tank 182 and fill a substantial amount of its volume. Like the third planar elements 226, the first planar elements 26 have no pre-manufactured or rigid frame and are preferably custom made to provide efficient use of the available space in the tank 182. The first planar elements 26 may range from 0.25 to 1 mm in thickness and are placed side by side at a distance of 5 to 15 mm to allow for biofilm growth and wastewater flow between adjacent first planar elements 26.

The tank 182 is deeper than it is long and it is preferred to encourage a straight and generally vertical flow path 188 over a substantial portion of the tank 182 with minimal mixing. This is done by leaving minimal space near the ends and sides of the tank 82 but a substantial amount of space near the top and bottom of the tank 82. Water to be treated may be partially recycled from the effluent outlet 186 to the feed inlet 184 but it is preferred that the recycle rate be small.

Oxygen containing gas is provided to each first apparatus 10 through its inlet conduit 16 connected to a manifold 94 located above the water to be treated. With the inlet manifold 94 located above the water, a leak in any first apparatus 10 will not admit water into the manifold nor any other first apparatus 210. The outlet conduits 18 are clipped in a convenient place, for example to the inlet manifold 94, above the surface of the water to be treated. Preferably, the gas is provided at a pressure of less than 10 kPa and the planar elements 26 are located more than 1 m deep in the tank 182. In this way, the gas pressure is exceeded by the pressure of the water to be treated which prevents the membranes 12 from ballooning. Glue lines (not shown), preferably not effecting more than one half of the area of the planar elements 26, can be used to reinforce part of the planar elements 26 if they can not be mounted deep enough.

Alternatively, gas flow through the first element 10 is produced by applying a suction, preferably of not more than 10 kPa less than atmospheric pressure, to the outlet conduits 18. The inlet conduits 16 are placed in fluid communication with the atmosphere. By this method, the rate of gas diffusion across the membrane 12 is slightly reduced, but no reinforcement of the membrane 12 (for example, by glue lines) is required regardless of the depth of the first element 10.

Oxygen diffuses through the membranes 12 preferably such that an aerobic biofilm is cultured adjacent the planar elements 26, an anoxic biofilm is cultivated adjacent the aerobic biofilm and the wastewater to be treated is maintained in an anaerobic state. A second source of agitation 196 is operated from time to time to agitate the first planar elements 26 to release accumulated biofilm. A suitable source of agitation is a series of mechanical mixers 102.

Other Reactors

The apparatus described above may also be used in alternative processes or arrangements. For example, gas transfer into a liquid can be achieved in a dead end configuration, ie. without an outlet conduit. In this case, however, it is preferable to provide a small outlet bleed to reduce condensation in the open space and vent gases transferred from the liquid into the open space of the apparatus. To remove gases from a liquid, a dead end configuration may also be used wherein no inlet conduit is provided. Use of the apparatus in some other applications is described below.

a) Water Degassing and Pervaporation

In water degassing, water containing dissolved gases such as nitrogen, oxygen or carbon dioxide flows into a tank. Planar elements as described above are immersed in the tank. A sweep gas flows through the planar element or a vacuum is applied to the planar element (the inlet conduit is omitted). Gases in the liquid cross the membrane to the inner space of the planar element from where they are removed through the outlet conduit. Water lean in dissolved gases leaves the tank. Such a process is useful, for example, in producing ultrapure water. Pervaporation is accomplished with a similar reactor but the feed water contains volatile organic compounds which diffuse to the inner space of the planar elements.

b) Humidification

In humidification, planar elements are immersed in a water bath. Dry air enters the planar elements. Water vapour crosses the membrane to the inner space of the planar element and humid air leaves the planar elements.

c) Air Cleaning

In air cleaning, planar elements are immersed in a water bath enriched with nutrients and a biofilm is cultured on the planar elements. Air containing volatile organic compounds flows into the planar elements and the volatile organic compounds diffuse through the membranes of the planar elements to the biofilm. Air lean in volatile organic compounds exits the planar elements.

Hybrid Membrane Supported Biofilm Process with Biological Phosphorous Removal

Figure 12:
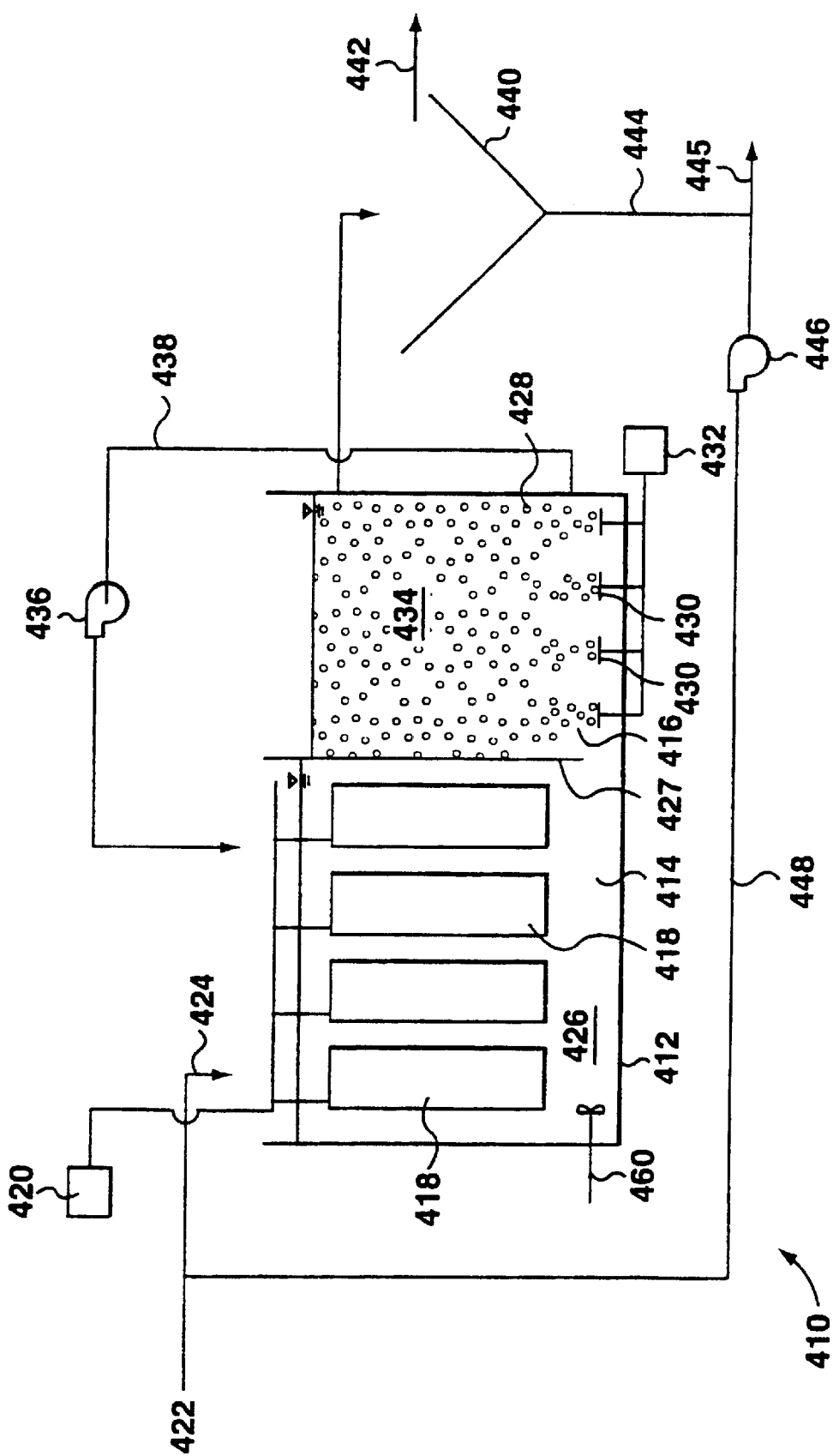
FIG. 12 is a schematic representation of a reactor for treating wastewater.

FIG. 12 shows a second reactor 410 for treating wastewater having a second tank 412 divided into first and second biological reaction sections which will be referred to as a membrane supported biofilm (MSB) section 414 and an aerated section 416 respectively. The two sections 414, 416 may be provided in a single second tank 412 or in multiple tanks.

The MSB section 414 has one or more gas transfer membrane modules 418 connected to an oxygen supply 420. The oxygen supply 420 is typically a pump drawing air from the atmosphere or a source of oxygen or oxygen enriched air. The oxygen supply 420 supplies an oxygen containing gas to the membrane modules 418 at a pressure which causes oxygen to flow through the membrane modules 418. Oxygen flows through the membrane modules 418 by diffusion without creating bubbles. Suitable designs for such membrane modules 418 are known in the art. Examples are described in U.S. Pat. No. 5,116,506 and in the preceding description of the apparatus 10, second apparatus 110 and third apparatus 210. The membrane modules 418 occupy between 2% and 20% of the volume of the MSB section 414. The remainder of the MSB section 414 is occupied by anaerobic mixed liquor 426 in an anaerobic part of the MSB section 414 in fluid communication with the outside of the membrane modules 418.

Screened wastewater 422 to be treated flows through an inlet 424 into the MSB section 414 wherein it becomes part of the anaerobic mixed liquor 426. Nutrients in the anaerobic mixed liquor 426 in combination with oxygen flowing through the membrane modules 418 cultivates a biofilm on the surface of the membrane modules 418. The oxygen supply 420 is controlled to provide sufficient oxygen to maintain an aerobic zone within the biofilm, preferably directly adjacent to the membrane modules 418. The oxygen supply is not sufficient, however, to create an entirely aerobic biofilm. Anoxic and possible anaerobic zones are also present in the biofilm, preferably in layers—the anoxic zone in a layer adjacent to the aerobic layer and the anaerobic zone, if any, adjacent to the anoxic zone. The oxygen supply is also not sufficient to oxygenate the anaerobic mixed liquor 426 which is in an anaerobic state at least in a region around the membrane modules 418. The anaerobic mixed liquor 426 is periodically agitated by operating a mechanical mixer 460, pumping through local recirculation loops or coarse bubble aeration (designed to not transfer significant amounts of oxygen to the anaerobic mixed liquor 426) to prevent complete settling of the anaerobic mixed liquor 426 and to control the thickness of the biofilm attached to the membrane modules 418.

Anaerobic mixed liquor 426 flows through a passage in a partition 427 to the aerated section 416 which is primarily an aerobic section. Bubbles 428 of oxygen containing gas are introduced into the aerated section 416 by diffusers 430 driven by a second oxygen supply 432, typically an air blower. The bubbles 428 are preferably fine and transfer oxygen to the anaerobic mixed liquor 426 making it a generally aerobic mixed liquor 434. Alternatively, other suitable aeration devices or oxygen sources operable to create aerobic conditions may be used in the second section.

A portion of the aerobic mixed liquor 434 is recycled to the MSB section 414 by a pump 436 in a second passage or recycle loop 438. Anoxic conditions are created in a localized zone in the MSB section 414 where the recycled aerobic mixed liquor 434 first mixes with the anaerobic mixed liquor 426. Another portion of the aerobic mixed liquor 434 flows to a clarifier 440 (or another liquid-solid separation device such as a membrane filter) and is separated into treated effluent 442 and settled activated sludge 444. Part of the sludge 444 is recycled to the MSB section 414 by a second pump 446 in a second recycle loop 448. Another part of the sludge 444 is discarded or treated further as waste activated sludge 445. The clarifier 440 and sludge second recycle loop 448 may be sized smaller than a clarifier in conventional activated sludge systems to account for the portion of the total biomass that is attached as a film to the membrane modules 418. Similarly, the recycle loop 438 may be sized smaller than the aerobic to anoxic recycle in a conventional activated sludge process for biological nutrient removal because significant amounts of nitrification and denitrification occur in the biofilm attached to the membrane modules 418.

The MSB section 414 is a complex reactor comprising a plurality of reaction zones. An aerobic reaction zone or section (usually signalled by the presence of dissolved oxygen) exists in the biofilm layer on the membrane modules. Anoxic zones or sections (usually signalled by the presence of $NO_3$ but absence of dissolved oxygen) exist in the biofilm layer and in the anaerobic mixed liquor 426 where the recycled aerobic mixed liquor 434 enters the MSB section 414. An anaerobic zone or section (usually signalled by the absence of $NO_3$ and dissolved oxygen) exists in the anaerobic mixed liquor 426 generally. This collection of reaction zones allows the following processes to occur in the MSB section 414:

Rough removal of BOD or COD occurs in the biofilm.

Rough removal of nitrogen occurs in the biofilm, by means of alternate nitrification and denitrification in the aerobic and anoxic sections of the biofilm.

Polishing denitrification occurs in the anaerobic mixed liquor 426.

Volatile fatty acids (VFA) are produced by fermentation in the anaerobic mixed liquor 426.

Phosphorous is released and VFA are assimilated by Bio-P organisms in the anaerobic mixed liquor 426.

Sludge is reduced anaerobically in the anaerobic mixed liquor 426.

Partial sedimentation of the anaerobic mixed liquor 426 produces a phosphorous rich solution near the surface of the aerobic mixed liquor 426.

The bubble-aerated section 416 is a simpler reactor, but still provides multiple functions including polishing COD and BOD removal, polishing nitrification and biological phosphorous uptake. These processes complement those occurring in the MSB section 414. For example, cycling mixed liquor between anaerobic and aerobic states promotes sludge reduction through digestion. The uptaken phosphorous is removed with the waste activated sludge 445. The effluent 442 leaving the clarifier 440 thus has reduced levels of all of COD, BOD, nitrogen and phosphorous.

Hybrid Membrane Supported Biofilm Process with Chemical Phosphorous Removal

Figure 13:
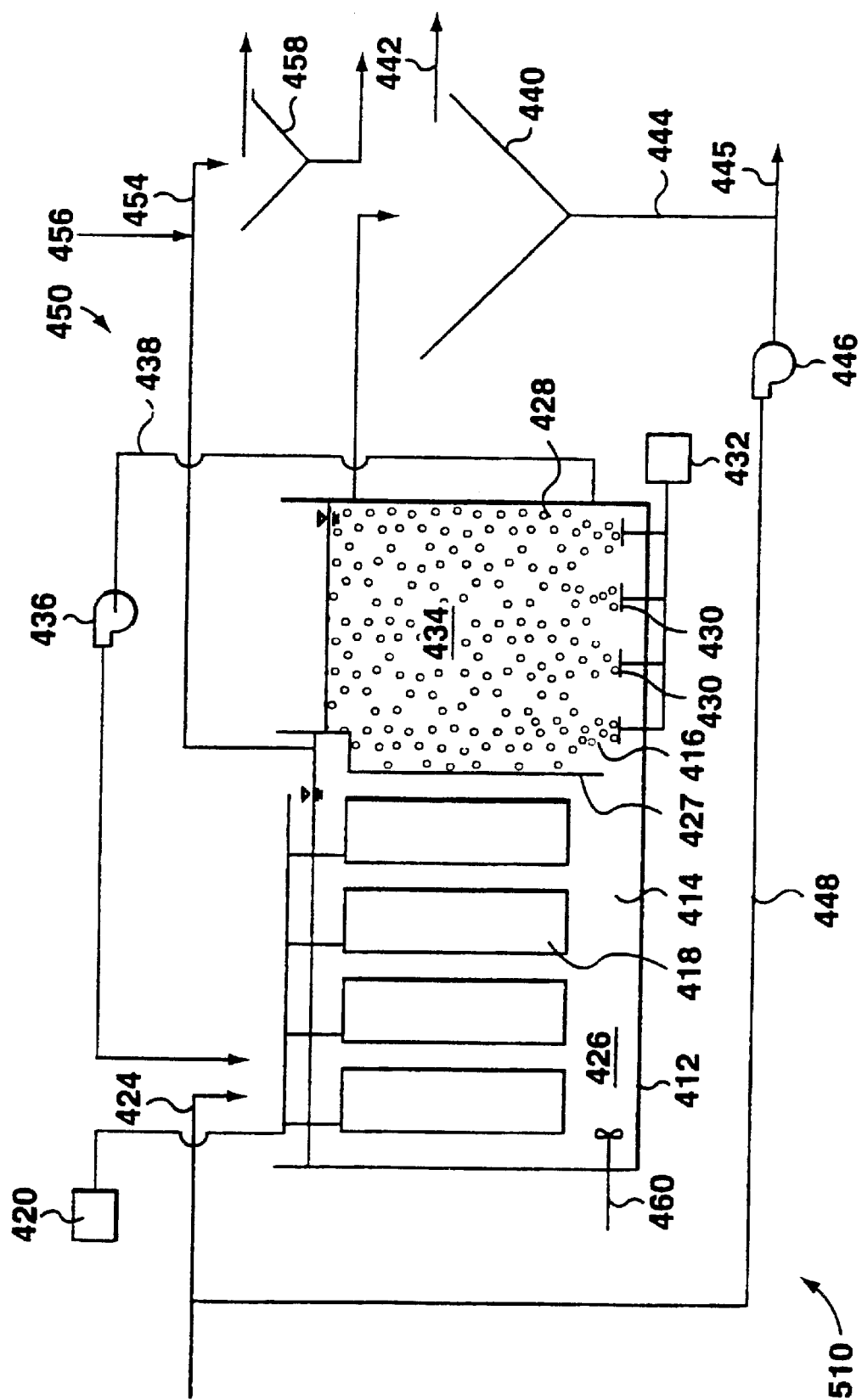
FIG. 13 is a schematic representation of a second reactor for treating wastewater.

FIG. 13 shows a third reactor 510 similar in structure and function to the reactor 510. In the third reactor 510, however, a chemical precipitation branch 450 is provided which receives fluid from the anaerobic mixed liquor 426, preferably from the top of the MSB section 414. The inlet to the chemical precipitation branch 450 is located away from the inlet 424 and the outlet from the recycle loop 438 so that the chemical precipitation branch 450 receives liquid from a truly anaerobic portion of the anaerobic mixed liquor 426. Further, the anaerobic mixed liquor 426 is not agitated, except periodically to remove biofilm from the membrane modules 418, and thus the anaerobic mixed liquor 426 partially settles. The liquid near the top of the MSB section 414 is thus reduced in suspended biomass as well as being rich in dissolved phosphorous released by suspended organisms moving from an aerobic environment (in the aerated section 416) to an anaerobic environment. Alternatively, a solids lean liquid can be extracted from the MSB section 414 through a clarifier, membrane or other solids liquid separation device which, although requiring additional equipment, does not require settling in the MSB section 414 and so the mixer 460 may be operated continuously. Solids rich liquid from such liquid separation devices is returned to the third reactor 510, preferably to the aerated section 416.

The liquid near the top of the MSB section 414 flows into a precipitation line 454, typically by gravity although a pump may also be used. Metal salts 456 are added to the precipitation line 454 to create either an amorphous sludge or a crystalline material that is removed in a clarifier 458 or other precipitate separation process such as a hydrocyclone. Because of the reduced amount of suspended biomass in the liquid extracted from the MSB section 414, and the higher concentration of phosphorous relative to conventional activated sludge systems with chemical phosphorous removal, phosphorous can be precipitated with more nearly stoichiometric doses of the metal salts. The resulting effluent may be either discharged or recycled to the third reactor 510, preferably to the aerated section 416, and the resulting sludge or crystalline material may be either discarded or processed further.

Removing phosphorous in the chemical precipitation branch 450 reduces the concentration of phosphorous in the waste activated sludge 445. This reduces the risk that phosphorous will be release through sludge processing and recycled to the third reactor 510. Having segregated a lower volume chemical sludge, its phosphorous content can be dealt with more easily.

Embodiments similar to those described above can be made in many alternate configurations and operated according to many alternate methods within the teachings of the invention, the scope of which is defined in the following claims.

We claim:

1. A reactor for treating wastewater to reduce concentrations of one or more of BOD, COD, nitrogen and phosphorous comprising,
   (a) an anaerobic section;
   (b) a plurality of gas transfer membrane modules for supporting and oxygenating a biofilm on the surface of the gas transfer membranes, the biofilm being in fluid communication with the anaerobic section and having aerobic and anoxic zones; and,
   (c) an aerobic section in fluid communication with the anaerobic section;
   (d) a wastewater inlet; and,
   (e) an outlet wherein wastewater enters the reactor through the inlet and flows through the reactor so as to be treated in the anaerobic section, the aerobic section and by contact with the biofilm before leaving the reactor through the outlet.

2. The reactor of claim 1 further comprising a liquid-solid separation device between the aerobic section and the outlet.

3. The reactor of claim 2 wherein liquid separated in the liquid-solid separation device flows to the outlet and a portion of a sludge containing solids separated in the liquid-solid separation device is recycled to the reactor.

4. The reactor of claim 1 wherein the gas transfer membrane modules are located within the anaerobic section.

5. The reactor of claim 1 further comprising a precipitation branch having a source of phosphorous precipitating agents and a precipitate separation device, the precipitation branch receiving fluid from the anaerobic section.

6. The reactor of claim 5 wherein the precipitation branch receives fluid from the top of the anaerobic section and the anaerobic section is quiescent from time to time such that the mixed liquor may at least partially settle.

7. A reactor for treating wastewater to reduce concentrations of one or more of BOD, COD, nitrogen and phosphorous comprising,
   (a) a first section containing a plurality of gas transfer membrane modules connected to an oxygen source operable to cultivate a biofilm on the surface of the gas transfer membranes having aerobic and anoxic zones while not disturbing an anaerobic condition existing in the first section generally,
   (b) a second section having an oxygen source operable to create aerobic conditions in the second section;
   (d) a wastewater inlet to the first section;
   (e) an outlet from the second section; and,
   (f) a passage from the first section to the second section and a second passage from the second section to the first section,
   wherein wastewater enters the reactor through the inlet and flows through the reactor so as to be treated in the anaerobic section, the aerobic section and by contact with the biofilm before leaving the reactor through the outlet.

8. The reactor of claim 7 further comprising a liquid-solid separation device between the second section and the outlet.

9. The reactor of claim 8 wherein liquid separated in the liquid-solid separation device flows to the outlet and a portion of a sludge containing solids separated in the liquid-solid separation device is recycled to the reactor.

10. The reactor of claim 7 further comprising a precipitation branch having a source of phosphorous precipitating agents and a precipitate separation device, the precipitation branch being configured to receive fluid from the anaerobic section.

11. The reactor of claim 10 wherein the precipitation branch is configured to receive fluid from the top of the anaerobic section and the anaerobic section is quiescent from time to time such that the mixed liquor may at least partially settle.

* * * * *